Nov. 15, 1966  J. A. BENEKE ETAL  3,285,433
UNLOADER FOR GREEN CERAMIC WARE
Filed Oct. 30, 1964  2 Sheets-Sheet 1

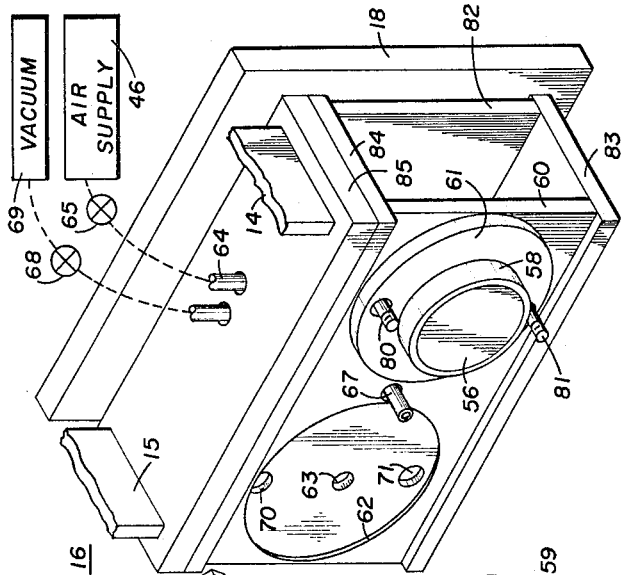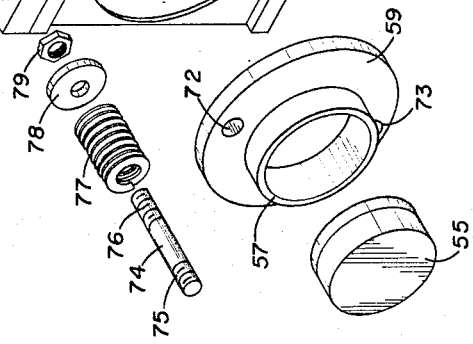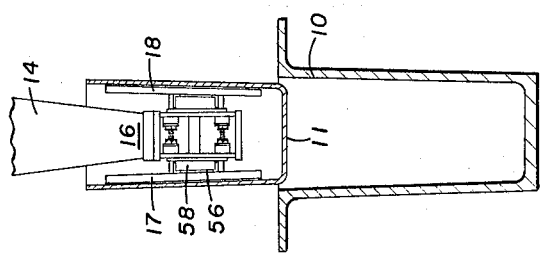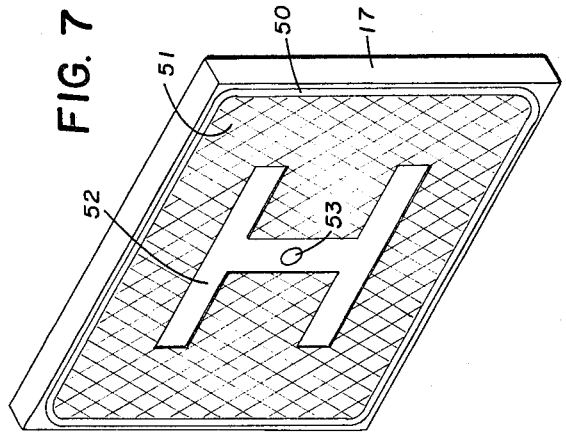

United States Patent Office 3,285,433
Patented Nov. 15, 1966

3,285,433
UNLOADER FOR GREEN CERAMIC WARE
Jene A. Beneke, Cornelius J. Kelleher, and Samuel G. Maguire, Dallas, Tex., assignors to Verson Manufacturing Co., a corporation of Texas
Filed Oct. 30, 1964, Ser. No. 407,721
2 Claims. (Cl. 214—1)

This invention relates to a system for unloading green ceramic articles from pressure forming molds, and more particularly to a pressure-actuated vacuum system adherent to the walls of the articles for applying retractive forces over a substantial area while applying a controlled force to withdraw the articles from the walls of the mold.

Sanitary ware traditionally has been formed by pouring a liquid slip into a suitable form, following which the slip is allowed to dry and harden. Following this, the form is removed from the hardened article which is then fired to complete the article of sanitary ware. It has been found that forming such articles can be materially implemented by utilization of a substantially dry charge. For example, a clay charge having a water content of the order of less than 20 percent has been employed. Such a charge is forced under high pressure in a mold into the desired shape. It has been found that when a charge is shaped into relatively deep thin-walled structures such as a storage tank or a water closet, the tank is not easily removed from the mold. Since the tank is green, it is easily damaged.

A system has been perfected for utilizing a relatively thin-walled mold liner which is inserted into a mold. A charge placed in the mold liner is then subjected to forming forces applied by a forming punch. By this means, the charge is extruded into a thin-walled product. Thereafter, the liner is removed from the mold with the product still in the liner. The present invention is directed to an unloader which will withdraw or unload an article, such as a tank, from its liner without damage to the tank.

More particularly, in accordance with the invention, there is provided an unloader adapted to hover over an unloading station with means for lowering an unloading head into a tank and for raising the same from within the tank. The unloading head includes a pair of vacuum plates mounted for movement laterally into engagement with opposite side walls of the tank. The unloading head includes means operable when in contact with the walls of the tank for applying a vacuum to the vacuum plates to grip the opposite tank walls, following which a laterally-directed retracting force is applied to the vacuum plates, accompanied by an upwardly-directed retracting force.

In one form, a pair of vacuum plates are mounted on an unloading head and are movable in opposite directions under actuation of a pair of short fluid-actuated cylinders. Each vacuum plate includes a peripheral sealing ring with a flow channel connected to a vacuum tank. Following application of a vacuum to the vacuum plates, the positioning cylinders are deenergized. A set of retracting spring-driven links coupled to the vacuum plates apply a moderate transverse retractive force to the vacuum plates to break the contact between the outer walls of the tank and the inner walls of the liner. Following this, an elevator coupled to the unloading head is actuated to withdraw the tank from the liner.

For a more complete understanding of the present invention and for further objects and advantages thereof, reference may now be had to the following description taken in conjunction with the accompanying drawings in which:

FIGURE 4 illustrates the tank leaving the mold;

FIGURE 5 is a front view of the unit of FIGURE 2;

FIGURE 6 is an exploded view of the actuating mechanism; and

FIGURE 7 is an enlarged view of the face plate.

Figure 1:
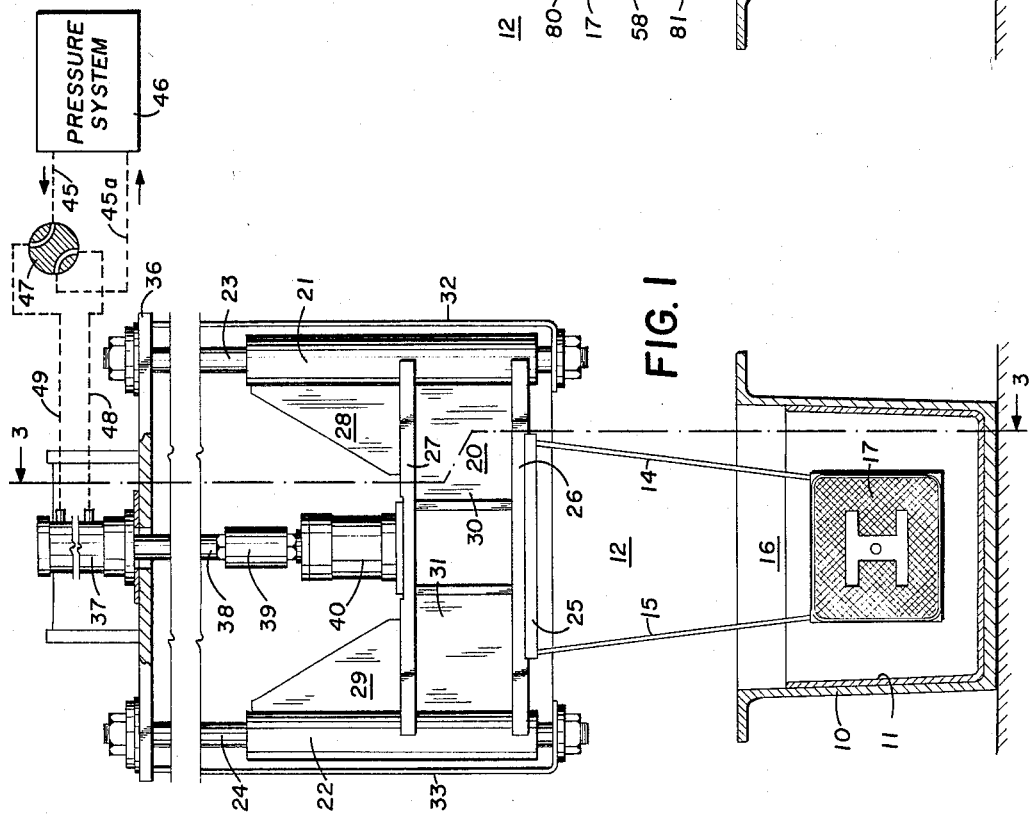
FIGURE 1 is a fragmentary view of an unloader for an article in a mold which is shown in section.

Referring to FIGURE 1, a relatively thin female mold liner 10 is shown in a transverse sectional view with a deep thin-walled ceramic tank 11 formed therein. The tank 11 is formed by placing the liner 10 in a rigid mold and then placing a relatively dry charge of ceramic material therein. Thereafter, a die having the configuration of the inner wall of the tank 11 is forced into the liner 10 to extrude the charge into the form of the relatively thin-walled tank 11. Thereafter, the die is withdrawn and the liner 10 is removed from the mold and transferred to an unloading station.

The problem to which the present invention is directed is the removal of a green ceramic tank having relatively deep thin side walls. The tank preferably is unloaded from the liner promptly so that the tank can be fired.

In accordance with the present invention, the liner 10 is supported at an unloading station for insertion of an unloader 12 for the removal of the tank 11. The unloader 12, FIGURES 1–3, has a pair of downwardly depending arms 14 and 15 which support an unloading head 16 which is pneumatically actuated to control a pair of face plates 17 and 18.

The arms 14 and 15 are connected to a platform 20 which has a pair of guide cylinders 21 and 22 which are mounted on guide rods 23 and 24, respectively. The arms 14 and 15 are mounted on a bottom plate 25, which in turn is secured to a plate 26 which interconnects the followers 21 and 22 at the lower ends thereof. A similar plate 27 interconnects the followers 21 and 22 at an intermediate point with brace plates 28 and 29 serving to maintain the relative orientation of the plate 27 and the followers 21 and 22. Plates 30 and 31 similarly couple the plates 26 and 27 together. Brackets 32 and 33 are secured to the ends of the guide rods 23 and 24, respectively. A plate 36 supports the guide rods 23 and 24 from the upper ends thereof, and in turn supports a pneumatic cylinder 37. A connecting rod 38 extends from the piston in cylinder 37 downward to engage the coupling member 39, which in turn is coupled by a short cylinder 40 to the plate 27. A pressure line 45 extends from a pressure pump 46 to a control valve 47. A return line 48 leads from the valve 47 to the pressure system 46. A line 49 leads from the valve 47 to the top of the cylinder 37. A line 45a leads from the bottom of the cylinder 37 to the valve 47. In the position shown, the cylinder 37 is energized to lower the head 16 into the tank 11.

As best shown in FIGURES 6 and 7, the unloading head 16 includes a pair of vacuum plates 17 and 18. Vacuum plate 17 has been shown in FIGURE 7 and includes a peripheral O-ring 50 which is set in the groove in the face of the plate 17. The O-ring 50 encompasses a resilient friction pad 51 which has a cutout section 52 therein which forms a vacuum area. A port 53 is provided for coupling to a vacuum line. The face of the friction pad 51 is grooved so that the entire area of the plate 17 inside the O-ring 50 may be effective to be adherent to the vertical side walls of the tank 11.

As shown in FIGURE 6, a pair of pneumatically-actuated pistons 55 and 56 are provided to move the plate 17 toward and away from the wall of the tank 11. The pistons 55 and 56 are integral with, or are conveniently secured to, the rear face of the plate 17. Pistons 55 and 56 operate in short cylinders 57 and 58, respectively. Cylinder 57 is secured, by a flange 59, to a plate 60 forming a part of the framework for the head 16. Similarly, the cylinder 58 is secured by a flange 61 to the head plate 60. The flanges 59 and 61 nest in the shallow cylindrical wells such as the well 62. Each well is provided with a port, such as the port 63, which is in communication with an air supply line 64 which leads by way of valve 65 to the air supply system 46. When valve 65 is opened, both the pistons 55 and 56 are actuated to move the vacuum plate 17 into engagement with the walls of the tank. The port 53 on the vacuum plate 17 is connected by way of a line 67 and valve 68 to a vacuum tank 69 so that when the O-ring 50 is in contact with the inner surface of the tank 11, a vacuum may be applied to the vacuum zone 52 so that the vacuum plate 17 will adhere to the tank wall.

A pair of openings 70 and 71 formed in the head plate 60 are in alignment with holes 72 and 73 in the flange 59. A bolt 74 is served, at the threaded end 75, into the rear face of the vacuum plate 17. The bolt 74 extends through hole 72 and hole 73. A return spring 77 encompasses the end 76 of bolt 74 and bears against the rear face of the head plate 60. A stop washer 78 and a jam nut 79 are positioned on the end 76 of bolt 74 to maintain the spring 77 under compression. A similar bolt (not shown) passes through holes 71 and 73 below the piston 55 and cylinder 57 for additional support of the vacuum plate 17. In a similar manner, bolts 80 and 81 provide support for the plate 17 above and below the piston 56.

The head plate 60 is coupled to a like plate 82 by a bottom plate 83 and a top plate 84. The plate 84 is connected to a plate 85 to which the lower ends of the arms 14 and 15 are fastened.

A pair of cylinders and four spring-actuated supporting bolts (not shown) are provided for control of the position of the vacuum plate 18 in the same manner as the control structure couples and controls plate 17. The vacuum lines and the compression lines are common for both plates 17 and 18.

Figure 2:
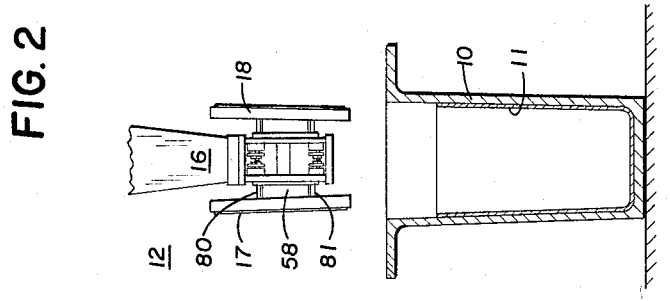
FIGURE 2 illustrates the unloader in extended position in the mold.

FIGURE 2 illustrates the unloading head 16 poised above the liner 10 containing tank 11. FIGURE 1 illustrates the unloading head 16 positioned inside the tank preparatory to actuation of the control cylinders for engagement of the walls of the tank 11 by the vacuum plates 17 and 18.

Figure 3:
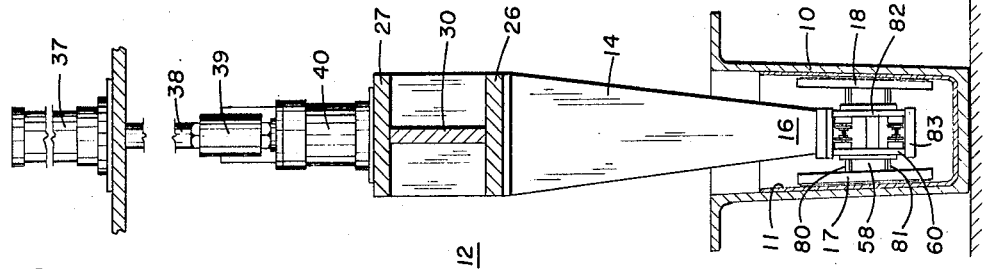
FIGURE 3 illustrates the unloader engaging the molded tank.

FIGURE 3 illustrates the unloader from a side view with the face plates 17 and 18 adjacent to but slightly spaced from the walls of tank 11. FIGURE 4 illustrates the plates 17 and 18 in contact with the inner walls of the tank 11. Contact is made by actuation by the four cylinders, two of which, cylinders 57 and 58, are shown in FIGURE 6. Pistons 55 and 56 move the vacuum plate 17 outwardly. A like pair of cylinders move the vacuum plate 18 outwardly. When the plates 17 and 18 are in contact with the inner walls of the tank 11, a vacuum is applied to the plates 17 and 18, as by actuating the valve 68, so that both plates adhere to the walls of the tank 11, over substantially the entire area thereof, inside the O-rings such as O-ring 50. The valve 65 in the air supply line 64 is then opened so that the air pressure is relieved from the pistons. Upon relief of the air pressure, the retracting springs such as spring 77 tend to retract the vacuum plates 17 and 18. The spring constants are so adjusted that the vacuum plates will break contact between the outer walls of the tank 11 and the inner wall of the liner 10. Thereafter, the valve 49 will be reversed so that the air cylinder 37 is actuated to elevate the head 16 above the liner 10, carrying the tank 11 with it.

By reason of the large contact area affected by the vacuum plates 17 and 18, the retractive force may be applied to the tank walls without damage, even though the walls are green and unfired. The tanks may thus be removed from the liners for transfer to a firing system.

It will be appreciated that changes in various features of the unloader may be made without departing from the present invention. Electrical control systems may be employed in place of the pneumatic system. The vacuum plates may take various configurations other than that shown. The invention therefore includes a pair of oppositely facing vacuum plates with control means to move them away from one another for application of a vacuum over substantial areas of opposed green ceramic walls with means for moving the plates in direction normal to the opposed movement of the plates to lift an article having deep thin green walls from its mold.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an unloader for a green ceramic tank which adheres to the walls of a mold having:
    (a) an unloading head having a pair of oppositely facing vacuum plates,
    (b) a frame having oppositely directed pneumatic cylinders,
    (c) pistons secured to confronting surfaces of said plates and operating in said cylinders,
    (d) means for applying compressed air to said cylinders to move said plates apart to contact opposite walls of said tank, and
    (e) means for applying a vacuum to said opposite walls through said plates, the combination which comprises:
    (f) resiliently biased stop means for limiting separation of said plates and for returning said plates to a retracted position when said cylinders are vented with said resilient means exerting forces on said plates adequate to break the seal between said walls of said mold and said walls of said tank, and
    (g) means for lifting said head out of said mold while maintaining said vacuum.

2. In a green ceramic tank mold unloader having:
    (a) an unloading head having a pair of oppositely facing vacuum plates,
    (b) a frame having oppositely directed pneumatic cylinders,
    (c) pistons secured to confronting surfaces of said plates and operating in said cylinders,
    (d) means for applying compressed air to said cylinders to move said plates apart to contact opposite walls of said tank, and
    (e) means for applying a vacuum to said opposite walls through said plates, the combination of,
    (f) four studs extending from the rear face of each of said plates into said frame,
    (g) means including a retracting spring on each said stud inside said frame resiliently to oppose separation of said plates wherein said springs exert forces on said plates to pull portions of said green tank confronting said plates away from the walls of said mold when said cylinders are vented, and
    (h) means for lifting said head out of said mold while maintaining said vacuum.

References Cited by the Examiner
UNITED STATES PATENTS 2,967,568   1/1961   Friday _____ 214—1 X
3,166,202   1/1965   Arnold _____ 214—1

MARVIN A. CHAMPION, *Primary Examiner.*